Patented Jan. 20, 1942

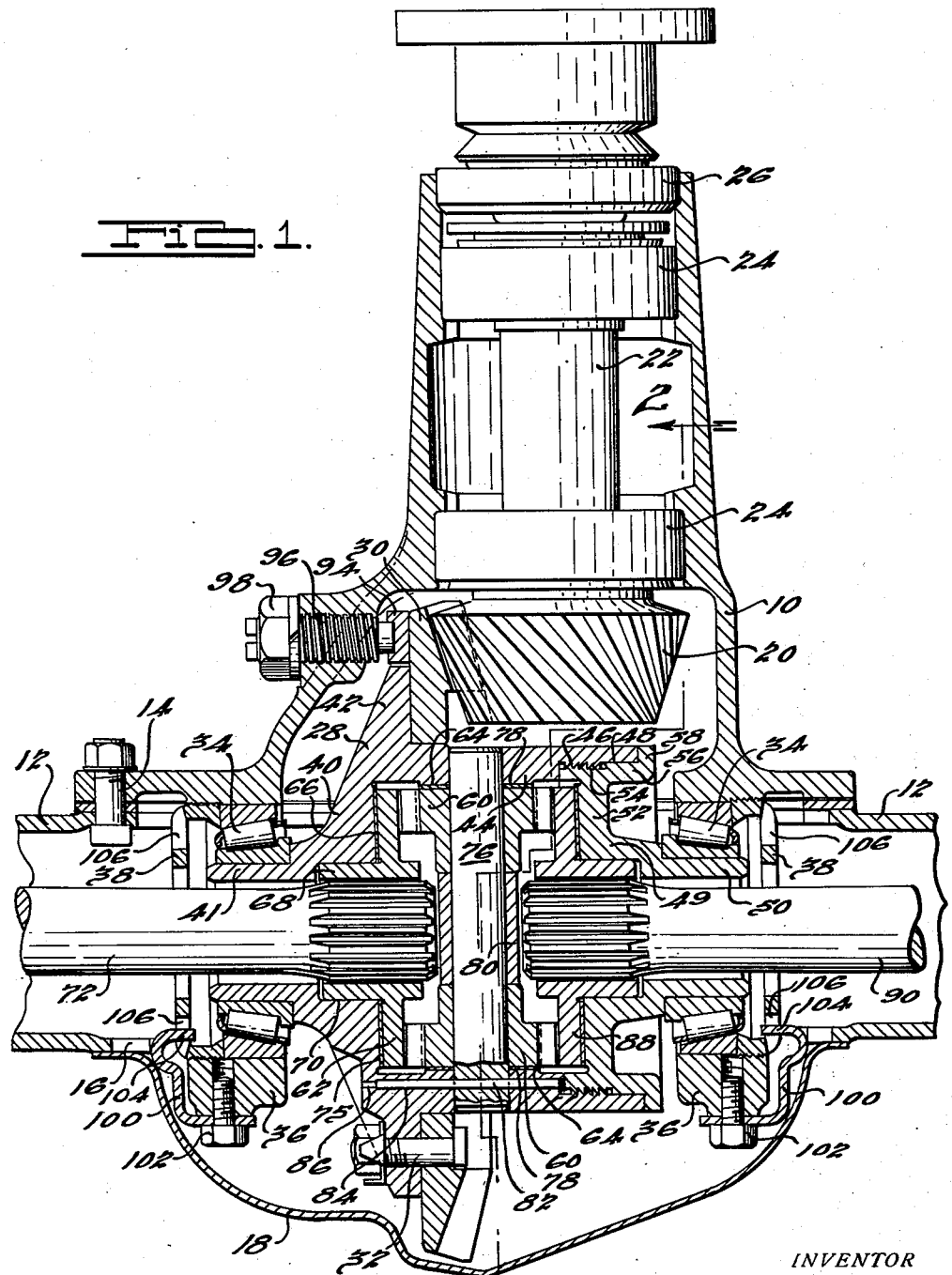

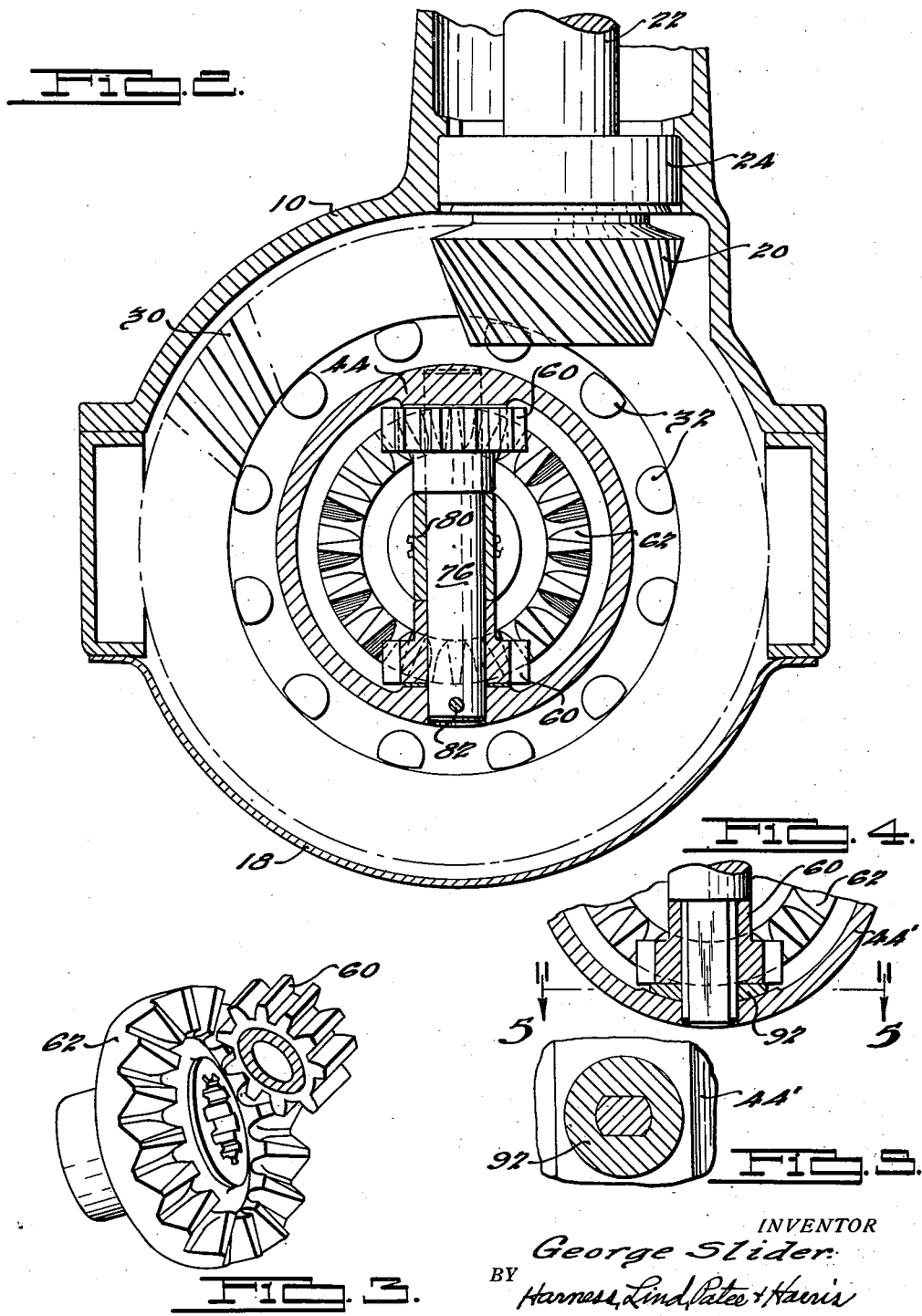

2,270,567

UNITED STATES PATENT OFFICE 2,270,567

DIFFERENTIAL MECHANISM

George Slider, Detroit, Mich., assignor to Chrysler Corporation, Highland Park, Mich., a corporation of Delaware Application April 13, 1940, Serial No. 329,401

3 Claims. (Cl. 74—312)

This invention relates to an axle structure and more particularly to a differential mechanism for an automobile driving axle.

An object of the invention is to provide a differential casing formed in two parts to permit easier machining of the internal bearing portions and to separate the parts in a plane spaced from the axis of the differential pinion pin.

Another object of the invention is to provide a connection between the two parts which may be screw threaded and to provide a screw thread which is not self centering and which withstands a maximum thrust in one direction, namely the direction of separation of the two parts.

A further object of the invention is to provide spur gears for the differential pinions and flat faced gears for the differential side gears.

Other objects and advantages of the invention will more fully appear from the following description taken in connection with the accompanying drawings, in which:

Fig. 1 is a sectional view through an automobile driving axle housing with the opposite outer ends of the axle broken away.

Fig. 2 is a sectional view of the axle taken on line 2—2 of Fig. 1.

Fig. 3 is a perspective view of one of the differential pinions in mesh with one of the differential side gears.

Fig. 4 is a fragmentary sectional view showing a modified form of differential pinion mounting, and Fig. 5 is a sectional view taken on line 5—5 of Fig. 4.

Referring to the drawings, the axle housing comprises a carrier housing 10 and tubular end portions 12 bolted to the carrier by bolts 14. The rear end of the housing has an opening 16 adapted to be closed by a cover plate 18 which is bolted or otherwise detachably secured to the tubular members 12. The tubular members 12 are integral and constitute the well known banjo housing.

A driving pinion 20, integral with pinion shaft 22 is journaled in bearings 24 which are supported in the carrier 10. An oil seal 26 is pressed in the end of the carrier 10.

The differential housing 28 carries a ring gear 30 which is detachably secured to the differential housing 28 by bolts 32 and positioned for driving engagement with the pinion 20.

The differential housing 28 is journaled in bearings 34 which are carried by the carrier 10. Split collars 36 are detachably secured to the carrier 10 to hold the bearings 34 in position and adjustable rings 38 position the bearings 34 axially. The rings 38 are screw threaded in the collars 36. A buttress thread is provided between the rings 38 and the collars 36 to obtain maximum thrust for a given size thread. The thrust being in one direction only, namely, outwardly from the differential mechanism, the buttress thread is desirable.

The differential housing 28 is formed in two parts. The one part 40 is provided with a bearing receiving sleeve 41, a ring gear receiving flange 42 and a cylindrical portion 44 having its outer end open and internally threaded as shown at 46. An unthreaded bearing portion 48 is located outwardly beyond the threads 46.

The other part 49 is made in the form of a cap having an outwardly extending sleeve 50 and a radially extending flange 52. The outer periphery of the flange 52 is screw threaded as at 54 for threaded engagement with the threads 46. An axially extending flange 56 has its outer periphery machined to accurately fit the bearing portion 48 to position the part 49 in proper relation relative to the part 40. An outer radially extending flange 58 is formed on the end of the flange 56 to engage the outer end of the cylindrical portion 44.

The screw threads 46 and 54 are of the buttress type and by their use two results have been accomplished. Maximum thrust for a given thread size has been obtained and the threads are not self centering as in the ordinary V type thread. This latter result permits the bearing portion 48 to center the part 49 with the openings in the bearing sleeves 42 and 50 in proper axial alignment.

The part 40 serves as the main body portion of the differential case and has its inner portion machined to receive the two differential pinions 60 and one of the differential side gears 62. By providing an open end in the cylindrical portion 44 tools may be easily inserted for the purpose of machining bearing seats 64 and 66 for the pinions 60 and side gear 62. These bearing seats 64 and 66 may be machined flat as shown in Figs. 1 and 2 or they may be machined cylindrical as shown in Fig. 4.

The side gear 62 is provided with a hub 68 which is journaled in a counter bore 70 of the differential housing 28. The axle shaft 72 is splined in the gear and is rotatable therewith. The back face of the gear bears against a bearing member 75.

The differential pinions 60 are journaled on a pin 76 which is received in diametrically disposed openings in the cylindrical portion 44 of the part 40. Bearing members 78 are provided between the outer faces of the pinions 60 and the faces 64 and a spacing sleeve 80 on the pin 76 is arranged between the adjacent ends of the pinions 60. The pin 76 is held in position by a transversely extending pin 82 which is received in an opening 84 in the cylindrical portion 44. The opening is counterbored to receive the pin 82 and at the outer end a smaller opening 86 is provided to insert a knockout tool for removing the pin 82. The pin 82 is inserted from the open end of the cylindrical portion 44 and is held in position by the inner face of the cap 49.

The other side gear 88 is formed the same as the gear 62 and receives the axle shaft 90. The gear 88 is held in position by the cap 49.

The axis of the pin 76 is spaced from the open end of cylindrical member 44 so that its axis is not in the plane of the parting line of the two parts 40 and 49. This adds to the rigidity of the parts and increases the strength over constructions where the differential casing is split at the axis of the pin.

Referring to Figs. 2 and 3 the side gears 62 are flat face and the pinions 60 are straight spur gears differing from the usual bevel gears commonly used for differential gearing. This permits increased strength because the gear teeth can be made larger than the usual bevel gear construction for a corresponding size gear.

In the form of the invention shown in Figs. 4 and 5 the bearing face for the pinions 60 is machined cylindrical with a washer 92 between the pinion 60 and the cylindrical portion 44' of the part 40. The washer 92 has one face formed cylindrical to fit the cylindrical bearing and its opposite face formed flat to fit the flat end of the pinion 60.

A backing bearing 94 is carried by an adjustable screw 96. The bearing 94 contacts the back face of the ring gear 30 at a point where the load is applied from the pinion 20. A lock nut 98 holds the screw in adjusted position.

The adjustable rings 38 are held in adjusted position by members 100 which are detachably secured to the collars 36 by bolts 102. The members 100 are provided with projections 104 which enter one of a series of openings 106 in the rings 38.

It will be understood that various changes including the size, shape and arrangement of parts may be made without departing from the spirit of my invention and it is not my intention to limit its scope other than by the terms of the appended claims.

I claim:

1. An axle assembly comprising a differential carrier, a driving pinion journaled in said carrier, a differential housing journaled in said carrier, a driven gear carried by said differential housing for driving engagement with said pinion, said differential housing comprising a cylindrical member having an integral face bearing at one end and being open at its opposite end, oppositely disposed face bearings on the inner surface of the cylindrical member of said differential housing, a removable cap for the open end of said differential housing having a face bearing in spaced relation to the face bearing at the one end of said differential housing, straight spur gears bearing on the face bearings on the inner surface of the cylindrical member, flat face side gears bearing on the face bearings of said differential housing and said removable cap in meshed engagement with said spur gears, and axle shafts driven by said side gears.

2. A differential mechanism comprising a differential housing having an end wall and a cylindrical portion integral with and extending at right angles to said end wall, the outer end of said cylindrical portion being open and having its inner periphery adjacent the open end threaded, a cylindrical bearing surface adjacent said threads, a cap having a portion of its outer periphery threaded for screwthread engagement with the threads of said housing and another portion formed with a cylindrical bearing surface for fitting engagement with the cylindrical bearing surface of said housing, axially aligned bearing supporting sleeves, one on said housing and one on said cap, differential gearings within said cylindrical portion, and axle shafts extending through said sleeves.

3. A differential mechanism comprising a differential housing having an end wall and a cylindrical portion integral with and extending at right angles to said end wall, the outer end of said cylindrical portion being open and having its inner periphery adjacent the open end threaded, a cylindrical bearing surface adjacent said threads, and a cap having a portion of its outer periphery threaded for screwthread engagement with the threads of said housing and another portion formed with a cylindrical bearing surface for fitting engagement with the cylindrical bearing surface of said housing, said screwthreads being of the buttress type and not self centering whereby said cap is centered with respect to said housing solely by said cylindrical bearing surfaces.

GEORGE SLIDER.